(12) United States Patent
Shinohara et al.

(10) Patent No.: US 11,227,498 B2
(45) Date of Patent: Jan. 18, 2022

(54) LANE CHANGE ASSIST SYSTEM, LANE CHANGE ASSIST DEVICE, AND LANE CHANGE ASSIST METHOD

(71) Applicant: TOYOTA JIDOSHA KABUSHIKI KAISHA, Toyota (JP)

(72) Inventors: Shuntaro Shinohara, Susono (JP); Yoshiyuki Kageura, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 413 days.

(21) Appl. No.: 16/430,754

(22) Filed: Jun. 4, 2019

(65) Prior Publication Data
US 2019/0378415 A1    Dec. 12, 2019

(30) Foreign Application Priority Data

Jun. 8, 2018 (JP) .............................. JP2018-110388

(51) Int. Cl.
*G08G 1/16* (2006.01)
*B60W 30/18* (2012.01)
*G06Q 20/22* (2012.01)

(52) U.S. Cl.
CPC ....... *G08G 1/167* (2013.01); *B60W 30/18163* (2013.01); *G06Q 20/223* (2013.01); *G08G 1/162* (2013.01); *G08G 1/166* (2013.01); *G06Q 2240/00* (2013.01)

(58) Field of Classification Search
CPC .................................................... G08G 1/167
See application file for complete search history.

(56) References Cited

U.S. PATENT DOCUMENTS

| | | | |
|---|---|---|---|
| 10,399,571 B2* | 9/2019 | Goto ..................... | B60W 60/00 |
| 10,479,362 B2* | 11/2019 | Goto ..................... | B60W 10/20 |
| 10,850,737 B2* | 12/2020 | Kim ................... | B60W 30/0956 |
| 11,059,485 B2* | 7/2021 | Wang ..................... | G08G 1/167 |
| 11,110,795 B2* | 9/2021 | Mizuno ............... | B60W 30/165 |
| 2018/0086338 A1* | 3/2018 | Yamada ................ | B60W 50/14 |
| 2018/0251155 A1* | 9/2018 | Chan ..................... | G08G 1/167 |
| 2019/0206255 A1* | 7/2019 | Tao ......................... | G07C 5/008 |
| 2019/0322281 A1* | 10/2019 | Wang ..................... | G08G 1/167 |
| 2021/0245759 A1* | 8/2021 | Yonemura ............. | G08G 1/167 |

FOREIGN PATENT DOCUMENTS

| | | |
|---|---|---|
| CN | 107545782 A | 1/2018 |
| JP | 2005-190233 | 7/2005 |
| JP | 2014-134897 A | 7/2014 |

* cited by examiner

*Primary Examiner* — Alex C Dunn
(74) *Attorney, Agent, or Firm* — Finnegan, Henderson, Farabow, Garrett & Dunner, LLP

(57) ABSTRACT

A lane change assist system provided with a first terminal in a first vehicle, a second terminal in a second vehicle, a third terminal in a third vehicle, and a lane change assist device, wherein the lane change assist device is configured to decrease the economic value held by the user of the first terminal or the first vehicle and increase the economic value held by the user of the third terminal or the third vehicle when the first vehicle driving on the first driving lane cuts into between the second vehicle and the third vehicle driving following one after the other on a second driving lane adjoining the first driving lane and changes lanes to the front of the third vehicle driving at the rear of the second vehicle.

12 Claims, 4 Drawing Sheets

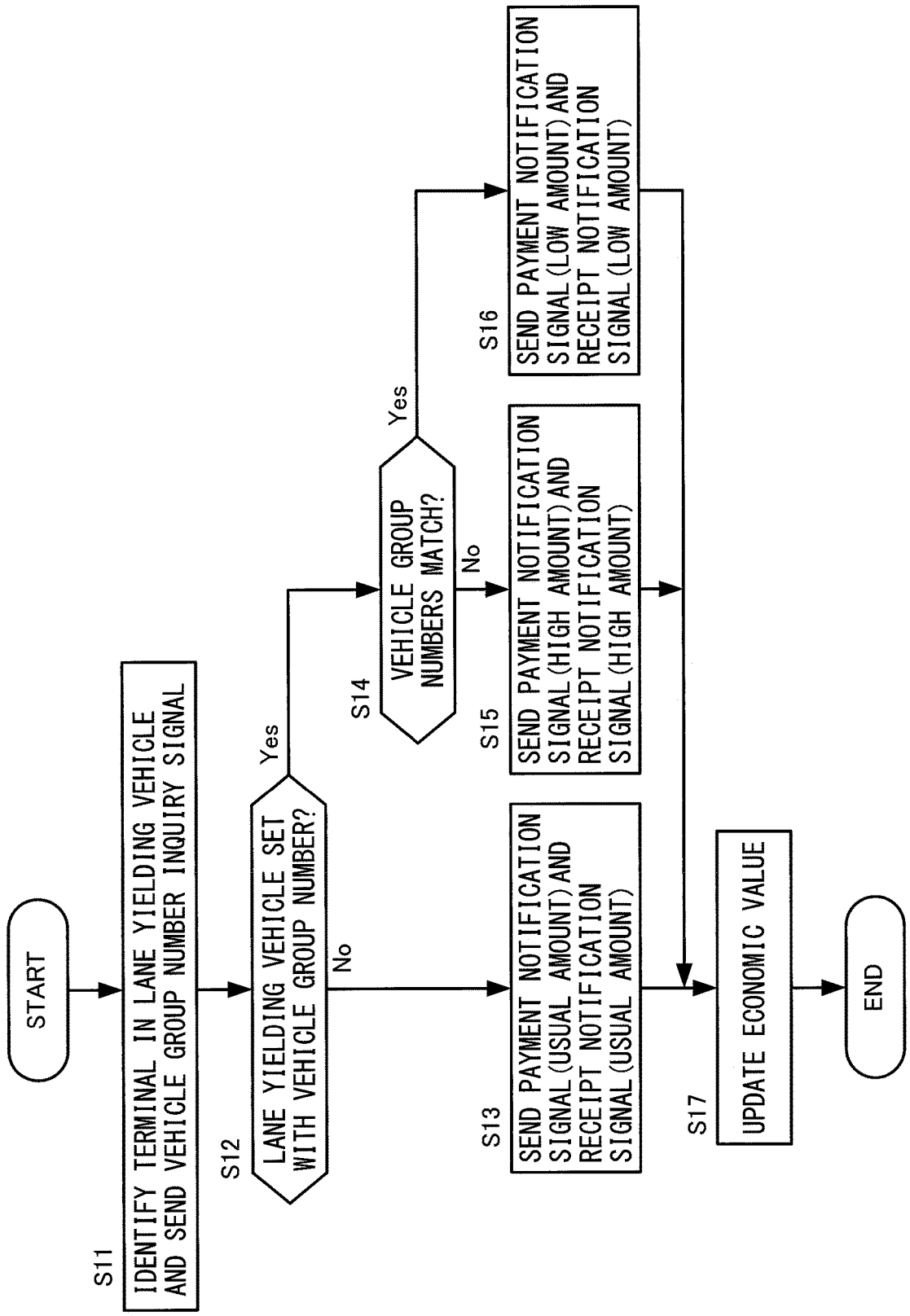

LANE CHANGE ASSIST SYSTEM, LANE CHANGE ASSIST DEVICE, AND LANE CHANGE ASSIST METHOD

CROSS-REFERENCE TO RELATED APPLICATION

This application claims priority based on Japanese Patent Application No. 2018-110388 filed with the Japan Patent Office on Jun. 8, 2018, the entire contents of which are incorporated into the present specification by reference.

FIELD

The present disclosure relates to a lane change assist system, lane change assist device, and lane change assist method.

BACKGROUND

Japanese Unexamined Patent Publication No. 2005-190233 discloses a road management system for smoothing the flow of vehicles on the road to ease road traffic by giving vehicles driving on a specific lane among the driving lanes or passing lane a discount on road tolls or other economic value so as to proactively prompt driving on the specific lane.

SUMMARY

Some drivers don't want other vehicles to change a lane to the front of their own vehicles and obstruct lane changes in front of their own vehicles. Therefore, even if like in the above-mentioned patent publication proactively prompting them to drive in a specific lane, sometimes it will not be possible to smoothly change a lane at the time of a lane change. Sometimes the flow of vehicles on the road will end up being disrupted.

The present disclosure was made focusing on such a problem and has as its object to provide a lane change assist system, lane change assist device, and lane change assist method enabling a smooth lane change.

To solve this problem, the lane change assist system according to one aspect of the present disclosure comprises a first terminal in a first vehicle, a second terminal in a second vehicle, and a third terminal in a third vehicle and a lane change assist device configured to be able to communicate with the first terminal, the second terminal, and the third terminal and to manage the economic values held by the user of the first terminal or the first vehicle, the user of the second terminal or the second vehicle, and the user of the third terminal or the third vehicle. Further, the lane change assist device is configured to decrease the economic value held by the user of the first terminal or the first vehicle and increase the economic value held by the user of the third terminal or the third vehicle when the first vehicle driving on the first driving lane cuts into between the second vehicle and the third vehicle driving on a second driving lane adjoining the first driving lane and changes a lane to the front of the third vehicle driving at the rear of the second vehicle.

Further, the lane change assist device according to one aspect of the present disclosure comprises a communication part configured to be able to communicate with a first terminal in a first vehicle, a second terminal in a second vehicle, and a third terminal in a third vehicle, a storage part configured to store the economic values respectively held by the first vehicle or the user of the first terminal, the second vehicle or the user of the second terminal, and the third vehicle or the user of the third terminal, and a control part. Further, the control part is configured to decrease the economic value held by the user of the first terminal or the first vehicle and increase the economic value held by the user of the third terminal or the third vehicle when the first vehicle driving on the first driving lane cuts into between the second vehicle and the third vehicle driving on a second driving lane adjoining the first driving lane and changes a lane to the front of the third vehicle driving at the rear of the second vehicle.

Further, the lane change assist method according to one aspect of the present disclosure is a lane change assist method having a first terminal in a first vehicle, a second terminal in a second vehicle, and a third terminal in a third vehicle and comprising decreasing the economic value held by the user of the first terminal or the first vehicle and increasing the economic value held by the user of the third terminal or the third vehicle when the first vehicle driving on the first driving lane cuts into between the second vehicle and the third vehicle driving on a second driving lane adjoining the first driving lane and changes a lane to the front of the third vehicle driving at the rear of the second vehicle.

According to these aspects of the present disclosure, the side yielding the lane can obtain economic value as consideration for having yielded the lane. For this reason, it is possible to reduce situations where the side yielding the lane obstructs a lane change, so the side changing the lane can smoothly change the lane.

BRIEF DESCRIPTION OF DRAWINGS

FIG. 4 is a flow chart for explaining processing relating to a server in lane change assist processing.

DESCRIPTION OF EMBODIMENTS

Figure 1:
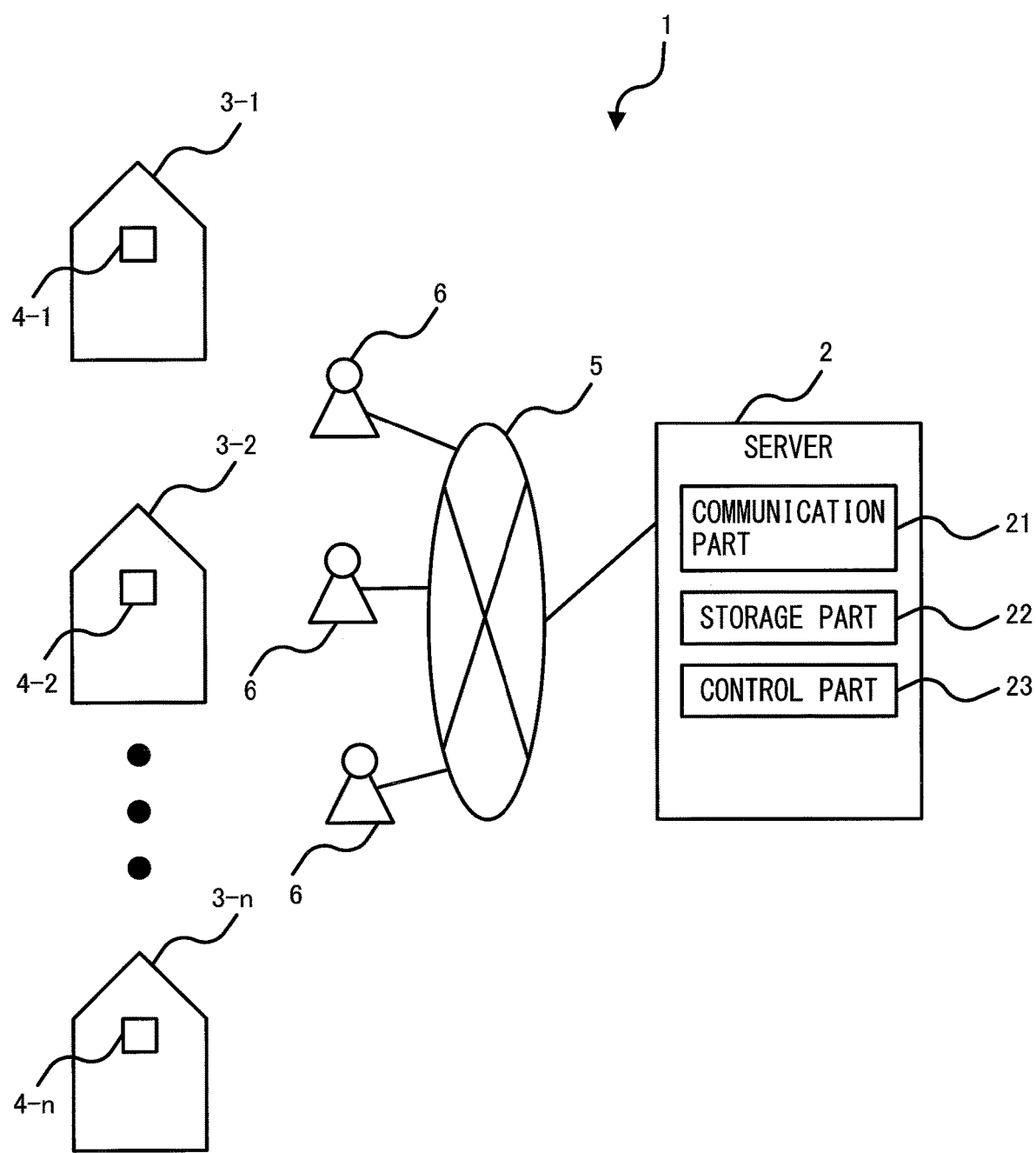
FIG. 1 is a schematic view of the configuration of a lane change assist system according to one embodiment of the present disclosure.

Below, referring to the drawings, an embodiment of the present disclosure will be explained in detail. Note that, in the following explanation, similar component elements are assigned the same reference numerals.

FIG. 1 is a schematic view of the configuration of a lane change assist system 1 according to one embodiment of the present disclosure.

The lane change assist system 1 is provided with a server 2 as one example of a lane change assist device and terminals 4-1 to 4-$n$ mounted in a plurality of vehicles 3-1 to 3-$n$ ("n" is an integer of 3 or more).

The server 2 is provided with a communication part 21, storage part 22, and control part 23.

The communication part 21 is provided with an interface circuit for connecting the server 2 to a communication network 5 and is configured to be able to communicate with the terminals 4-1 to 4-$n$ through the communication network 5. That is, the server 2 and the plurality of terminals 4-1 to 4-$n$ can communicate with each other through the communication network 5.

The storage part 22 stores identification information of the vehicles 3-1 to 3-$n$ and identification information of the terminals 4-1 to 4-$n$ linked together. In the present embodiment, the storage part 22 stores license plate numbers of the vehicles 3-1 to 3-$n$ as identification information of the vehicles 3-1 to 3-$n$ and MAC addresses of the terminals 4-1 to 4-$n$ as identification information of the terminals 4-1 to 4-$n$.

Further, the storage part 22 stores the balances of the economic values held by the users of the terminals 4-1 to 4-$n$. The "economic value" in the present embodiment means for example virtual currency or electronic money, points issued by companies, gift cards issued by companies, and other information having economic value. Note that in the present embodiment, the example is shown where the users of the terminals 4-1 to 4-$n$ hold the economic value, but the disclosure is not limited to this. The economic value may also be held by the vehicles 3-1 to 3-$n$.

Further, the storage part 22 stores data etc. generated during the various processing performed at the control part 23.

The control part 23 performs processing relating to the server 2 in the lane change assist processing performed by the lane change assist system 1. Details of the lane change assist processing will be explained later.

The terminals 4-1 to 4-$n$ are devices which can communicate with the server 2 through a wireless base station 6 and communication network 5 and are provided with input devices such as touch panels and microphones and output devices such as touch panels and speakers. Further, the terminals 4-1 to 4-$n$ are designed to be able to receive information required for lane change assist processing acquired by car-mounted devices mounted at the vehicles 3-1 to 3-$n$ (for example, image information captured by cameras for capturing the scene outside of the vehicles). The terminals 4-1 to 4-$n$ may also be car-mounted terminals such as for example navigation systems installed in advance at the vehicles 3-1 to 3-$n$ or may be mobile terminals such as smart phones or tablet terminals brought into the vehicles 3-1 to 3-$n$ by the occupants of the vehicles 3-1 to 3-$n$.

Here, to smooth the flow of vehicles on the road to ease road traffic, it is effective to enable a smooth lane change. However, a lane change basically works when the driver at the side yielding the lane is willing to yield. Even if it yields the lane, it cannot obtain any consideration, so some drivers do not want other vehicles to change a lane to the front of their own vehicles and obstruct lane changes to the front of their own vehicles.

Further, for example, sometimes several vehicles belonging to a specific group such as friends or family will form a group of vehicles which drive following one after the other. In such a case, many persons do not want a vehicle not belonging to that specific group to cut into that group of vehicles by a lane change. Sometimes they will block vehicles not belonging to that specific group from cutting in by a lane change.

On the other hand, if even strangers could facilitate lane changes among vehicles for example heading to the same destinations and proactively form a group of vehicles, sometimes it would be possible to smooth the flow of vehicles on the road to facilitate road traffic.

Therefore, in the lane change assist system 1 according to the present embodiment, when changing a lane, the side yielding the lane may receive economic value from the side changing the lane as consideration for yielding the lane.

Due to this, the side yielding the lane benefits as well, so situations where the side yielding the lane obstructs a lane change can be reduced. As a result, the side changing the lane becomes able to smoothly change the lane.

Further, in the lane change assist system 1 according to the present embodiment, when the side changing the lane and the side yielding the lane do not belong to the same group and the vehicles of the side yielding the lane are vehicles forming a group of vehicles belonging to a specific group, the amount of economic value which the side changing the lane pays can be increased over the usual amount and the amount of economic value which the side yielding the lane can receive can be increased over the usual amount.

Due to this, when the side changing the lane changes the lane to the middle of a group of vehicles of a group to which it does not belong, it is necessary to pay a higher economic value than usual. For this reason, it is possible to inhibit a lane change to the middle of such a group of vehicles, so it is possible to keep a lane change from not being performed smoothly and the flow of vehicles on the road from ending up being disrupted. On the other hand, when the side yielding the lane yields the lane to a vehicle of a group different from his own vehicle, he can receive higher economic value than usual. For this reason, situations where the side yielding the lane obstructs a lane change can be reduced. As a result, the side changing the lane can smoothly change the lane.

Further, in the lane change assist system 1 according to the present embodiment, when the side changing the lane and the side yielding the lane belong to the same group, the amount of economic value which the side changing the lane pays is reduced from usual and the amount of the economic value which the side yielding the lane can receive is reduced from usual.

Due to this, it is possible to facilitate vehicles belonging to the same group proactively forming a group of vehicles and smooth the flow of vehicles on the road to facilitate road traffic.

Figure 2:
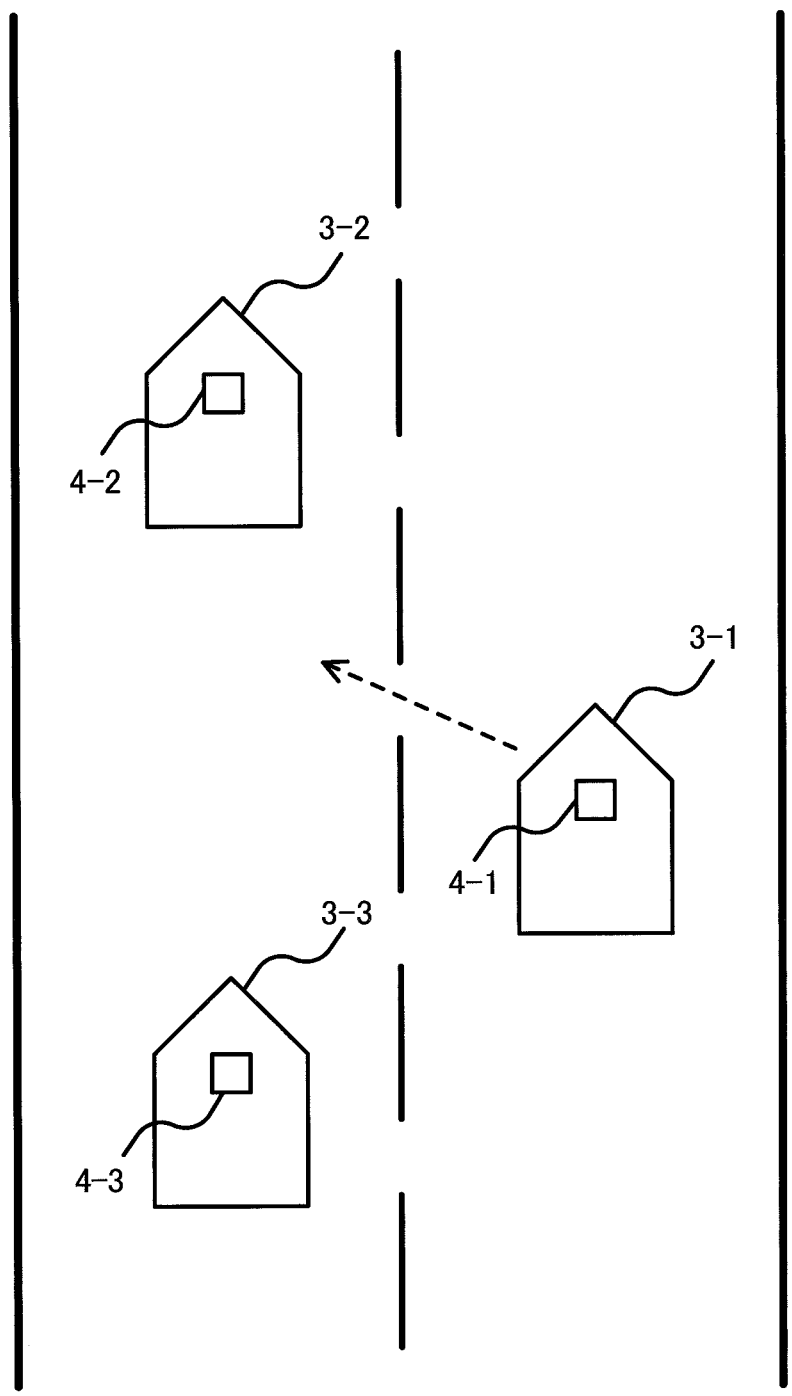
FIG. 2 is a view showing one example of state when lane change assist processing is performed in the lane change assist system.

Below, details of the lane change assist processing performed by the lane change assist system 1 according to the present embodiment will be explained. FIG. 2 is a view showing one example of the state when lane change assist processing is performed in the lane change assist system 1.

In the example shown in FIG. 2, on a one-side two lane road, the vehicle 3-2 and the vehicle 3-3 are driving on a driving lane following one after the other. Further, assume the vehicle 3-1 driving on the passing lane cuts between the vehicle 3-2 and the vehicle 3-3 to change the lane to the front of the vehicle 3-3.

Figure 3:
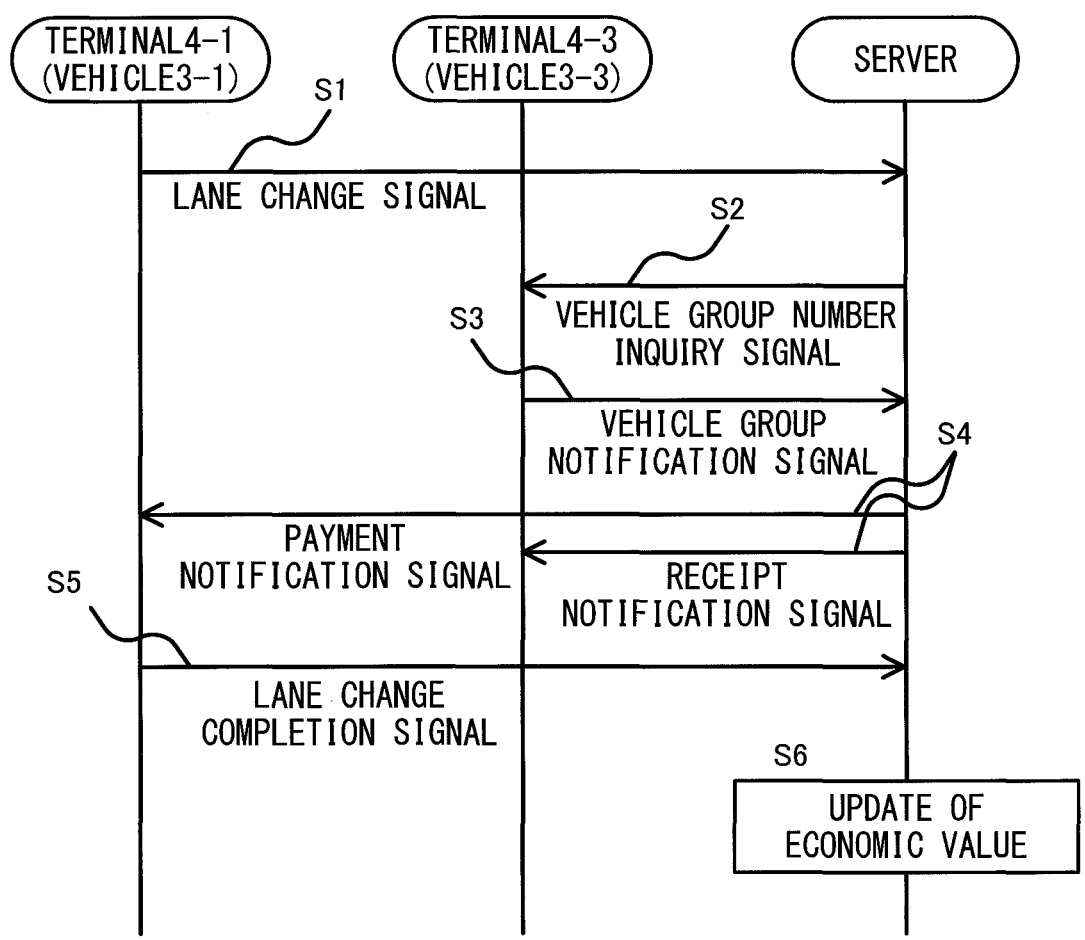
FIG. 3 is a view showing one example of an operation sequence in lane change assist processing.

FIG. 3 is a view showing one example of an operation sequence in the lane change assist processing. In the state shown in FIG. 2, the vehicle 3-1 indicates its intent to change a lane to the front of the vehicle 3-3 and actually changes the lane to the front of the vehicle 3-3. The flow of the lane change assist processing at that time is shown.

At step S1, if for example the turn signal of the vehicle 3-1 is operated etc. and the intent of the driver to change a lane is detected, the terminal 4-1 in the vehicle 3-1 sends a lane change signal to the server 2. Note that if the vehicle mounts an automated driving system, a lane change signal may be sent when changing a lane by the judgment of the automated driving system.

The lane change signal includes identification information of the vehicle 3-3 trying to cut in front recognized by a device mounted in the vehicle 3-1 (in the present embodiment, a camera for capturing the scene outside of the vehicle) (in the present embodiment, the license plate number of the vehicle 3-3).

Further, the lane change signal includes a vehicle group number of the vehicle 3-1 when the vehicle 3-1 is set with a vehicle group number. The vehicle group number includes an explicit vehicle group number showing an explicit relationship and a non-explicit vehicle group number showing a non-explicit relationship. The "explicit vehicle group number" is, for example, a number registered in advance at the terminal 4-1 by the driver of the vehicle 3-1 before starting driving etc. when forming a group of vehicles by a specific group such as friends or family. On the other hand, the "non-explicit vehicle group number" is a number which is automatically assigned by the terminal 4-1 in accordance with the destination set by the navigation system etc. mounted in the vehicle.

At step S2, the server 2 receiving the lane change signal identifies the vehicle 3-3 based on the identification information of the vehicle 3-3 contained in the lane change signal and sends a vehicle group number inquiry signal to the terminal 4-3 in the vehicle 3-3.

At step S3, the terminal 4-3 receiving the vehicle group number inquiry signal confirms if the vehicle 3-3 is set with a vehicle group number and sends a vehicle group number notification signal to the server 2. If the vehicle 3-3 is set with a vehicle group number, the vehicle group number notification signal includes the vehicle group number of the vehicle 3-3. On the other hand, if the vehicle 3-3 is not set with a vehicle group number, the vehicle group number notification signal includes information to the effect that the vehicle 3-3 is not set with a vehicle group number.

At step S4, the server 2 receiving the vehicle group number notification signal confirms if the vehicle 3-3 is set with a vehicle group number. If a vehicle group number is set, it judges if the vehicle group number of the vehicle 3-1 and the vehicle group number of the vehicle 3-3 match, sends a payment notification signal to the terminal 4-1 in the vehicle 3-1, and sends a receipt notification signal to the terminal 4-3 in the vehicle 3-3.

The payment notification signal includes information relating to the amount of payment of economic value which the vehicle 3-1 side must pay when changing a lane. The receipt notification signal includes identification information of the vehicle 3-1, information to the effect that the vehicle 3-1 has indicated the intent of a lane change, and information relating to the amount of receipt of economic value which the vehicle 3-3 side can receive from the vehicle 3-1 side when yielding the lane.

At this time, in the present embodiment, if the vehicle 3-3 was not set with a vehicle group number, the amount of payment of economic value of the vehicle 3-1 side is set to a predetermined usual payment amount while the amount of receipt of economic value of the vehicle 3-3 side is set to a predetermined usual receipt amount. At this time, in the present embodiment, the amount of payment of economic value of the vehicle 3-1 side becoming the side changing the lane is made to become greater than the amount of receipt of economic value of the vehicle 3-3 side becoming the side yielding the lane. Due to this, the amount of difference of the payment amount and receipt amount can be obtained as the handling fee of the server 2 side.

On the other hand, if the vehicle 3-3 is set with a vehicle group number, when the vehicle group number of the vehicle 3-1 and the vehicle group number of the vehicle 3-3 do not match, the amount of payment of economic value of the vehicle 3-1 side is set to an amount larger than the usual payment amount while the amount of receipt of economic value of the vehicle 3-3 side is set to an amount larger than the usual receipt amount. Further, if the vehicle 3-3 had been set with a vehicle group number, when the vehicle group number of the vehicle 3-1 and the vehicle group number of the vehicle 3-3 match, the amount of payment of economic value of the vehicle 3-1 side is set to an amount smaller than the usual payment amount while the amount of receipt of economic value of the vehicle 3-3 side is set to an amount smaller than the usual receipt amount.

At step S5, the driver of the vehicle 3-1 allows payment of economic value of the payment amount included in the payment notification signal as consideration for changing the lane. If changing a lane, the terminal 4-1 sends a lane change completion signal to the server 2. Note that whether the lane has been changed may be judged by, for example, confirming the driving lane of the vehicle 3-1 by a device mounted in the vehicle 3-1 (in the present embodiment, a camera for capturing the scene outside of the vehicle).

Note that whether the vehicle 3-1 has changed a lane may be judged by the server 2 side based on the positional information of the vehicle 3-1 and the vehicle 3-3 if for example positional information of the vehicles 3-1 to 3-*n* received by the GPS receivers from the terminals 4-1 to 4-*n* is sent to the server 2.

At step S6, the server 2 receiving the lane change completion signal updates the stored amounts of economic value held by the users of the terminals 4-1 to 4-*n*. Specifically, the server 2 decreases the economic value which the user of the terminal 4-1 holds by exactly the payment amount included in the payment notification signal. Further, the server 2 increases the economic value which the user of the terminal 4-3 holds by exactly the receipt amount included in the receipt notification signal.

FIG. 4 is a flow chart for explaining processing relating to the server 2 in lane change assist processing. The processing is performed by the control part 23 of the server 2 if the communication part 21 of the server 2 receives a lane change signal from the vehicle of the side changing the lane (below, referred to as the "lane changing vehicle").

At step S11, the server 2 identifies the terminal in the vehicle becoming the side yielding the lane (below, referred to as the "lane yielding vehicle") based on the identification information of the lane yielding vehicle included in the received lane change signal and sends the vehicle group number inquiry signal to the terminal in the lane yielding vehicle.

At step S12, when receiving a vehicle group number notification signal sent from the terminal in the lane yielding vehicle, the server 2 confirms from the information contained in that vehicle group number notification signal if the lane yielding vehicle is set with a vehicle group number. If a vehicle group number is not set, the routine proceeds to the processing of step S13, while if a vehicle group number is set, the routine proceeds to the processing of step S14.

At step S13, the server 2 sends the terminal in the lane changing vehicle a payment notification signal setting the amount of economic value which the lane changing vehicle side pays to a usual payment amount and sends the terminal in the lane yielding vehicle a receipt notification signal setting the amount of economic value which the lane yielding vehicle can receive to a usual receipt amount.

At step S14, the server 2 judges if the vehicle group number of the lane changing vehicle and the vehicle group number of the lane yielding vehicle match. If they do not match, it proceeds to the processing of step S15, while if they match, it proceeds to the processing of step S16.

At step S15, the server 2 sends the terminal in the lane changing vehicle a payment notification signal setting the amount of economic value which the lane changing vehicle side pays to an amount greater than the usual payment amount and sends the terminal in the lane yielding vehicle a receipt notification signal setting the amount of economic value which the lane yielding vehicle can receive to an amount greater than the usual receipt amount.

At step S16, the server 2 sends the terminal in the lane changing vehicle a payment notification signal setting the amount of economic value which the lane changing vehicle side pays to an amount smaller than the usual payment amount and sends the terminal in the lane yielding vehicle a receipt notification signal setting the amount of economic value which the lane yielding vehicle can receive to an amount smaller than the usual receipt amount.

At step S17, if receiving a lane change completion signal sent from the terminal in the lane changing vehicle, the server 2 updates the balance of the economic value held by the user of the terminal in the lane changing vehicle and the balance of the economic value held by the user of the terminal in the lane yielding vehicle. Specifically, the server 2 decreases the balance of the economic value of the user of the terminal in the lane changing vehicle which was stored in the storage part 22 by exactly the payment amount included in the payment notification signal. Further, the server 2 increases the balance of the economic value of the user of the terminal in the lane yielding vehicle which was stored in the storage part 22 by exactly the receipt amount included in the receipt notification signal.

The lane change assist system 1 according to the present embodiment explained above is provided with the first terminal 4-1 in the first vehicle 3-1, the second terminal 4-2 in the second vehicle 3-2, and the third terminal 4-3 in the third vehicle 3-3 and the server 2 (lane change assist device) able to communicate with the first terminal 4-1, the second terminal 4-2, and the third terminal 4-3 and managing the economic value respectively held by the user of the first terminal 4-1 or the first vehicle 3-1, the user of the second terminal 4-2 or the second vehicle 3-2, and the user of the third terminal 4-3 or the third vehicle 3-3.

Further, the server 2 is configured to decrease the economic value held by the user of the first terminal 4-1 or the first vehicle 3-1 and increase the economic value held by the user of the third terminal 4-3 or the third vehicle 3-3 when the first vehicle 3-1 driving on the first driving lane cuts between the second vehicle 3-2 and the third vehicle 3-3 driving on the second driving lane adjoining the first driving lane and changes a lane to the front of the third vehicle 3-3 driving behind the second vehicle 3-2.

Due to this, according to the present embodiment, when a lane change is performed, the side yielding the lane can receive an economic value from the side changing the lane as consideration for yielding the lane. For this reason, the side yielding the lane also benefits, so situations where the side yielding the lane obstructs a lane change can be reduced. As a result, the side changing the lane can smoothly change a lane.

Further, the server 2 according to the present embodiment is configured to change the amount of decrease of the economic value held by the user of the first terminal 4-1 or the first vehicle 3-1 and the amount of increase of the economic value held by the user of the third terminal 4-3 or the third vehicle 3-3 in accordance with the group to which the first vehicle 3-1 belongs when the second vehicle 3-2 and the third vehicle 3-3 formed a group of vehicles belonging to a specific group.

More specifically, the server 2 is configured so that if the second vehicle 3-2 and the third vehicle 3-3 formed a group of vehicles belong to a specific group, when the group to which the first vehicle 3-1 belongs and the group to which the second vehicle 3-2 and the third vehicle 3-3 belong differ, it increases the amount of decrease of the economic value held by the user of the first terminal 4-1 or the first vehicle 3-1 and increases the amount of increase of economic value held by the user of the third terminal 4-3 or the third vehicle 3-3 compared to if the second vehicle 3-2 and the third vehicle 3-3 did not form a group of vehicles belonging to a specific group.

Due to this, according to the present embodiment, when the side changing the lane and the side yielding the lane do not belong to the same group and the vehicle of the side yielding the lane forms a specific group of vehicles, the amount of the economic value which the side changing the lane pays becomes greater than usual and the amount of economic value which the side yielding the lane can receive becomes greater than usual.

Therefore, the side changing the lane has to pay a higher economic value than usual when changing a lane to the middle of a group of vehicles of a group to which one's own vehicle does not belong. Therefore, since it is possible to suppress a lane change toward the middle of such a group of vehicles, it is possible to keep a lane change from not being performed smoothly and the flow of vehicles on the road from ending up being disrupted.

Further, the side yielding the lane can receive a higher economic value than usual in the case of yielding a lane to a vehicle in a group to which one's own vehicle does not belong, so it is possible to decrease the situations where the side yielding the lane obstructs a lane change. As a result, the side changing the lane becomes able to smoothly change the lane.

On the other hand, the server 2 is configured so that if the second vehicle 3-2 and the third vehicle 3-3 formed a group of vehicles belonging to a specific group, when the group to which the first vehicle 3-1 belongs and the group to which the second vehicle 3-2 and the third vehicle 3-3 belong are the same, it decreases the amount of increase of economic value held by the user of the third terminal 4-3 or the third vehicle 3-3 and decreases the amount of increase of the economic value held by the user of the third terminal 4-3 or the third vehicle 3-3 compared to if second vehicle 3-2 and the third vehicle 3-3 did not form a group of vehicles belonging to a specific group.

Due to this, it is possible to proactively promote the formation of a group of vehicles by the vehicles belonging to a same group.

Note that the server 2 judges to which groups the first vehicle 3-1, the second vehicle 3-2, and the third vehicle 3-3 belong based on the vehicle group numbers sent from the first terminal 4-1, the second terminal 4-2, and the third terminal 4-3. The vehicle group numbers, for example, are numbers input by occupants of the first vehicle 3-1, the second vehicle 3-2, and the third vehicle 3-3 to the first terminal 4-1, the second terminal 4-2, and the third terminal 4-3. Further, the vehicle group numbers are, for example, numbers which are automatically input by the first terminal 4-1, the second terminal 4-2, and the third terminal 4-3 based on the destinations of the first vehicle 3-1, the second vehicle 3-2, and the third vehicle 3-3.

Above, embodiments of the present disclosure were explained, but the above embodiments only show some of the applications of the present disclosure. They are not meant to limit the technical scope of the present disclosure to the above embodiments.

For example, in the above embodiments, the example was shown of the vehicle 3-2 and the vehicle 3-3 forming a group of vehicles following one after the other, but a "group of vehicles" is not just formed by vehicles driving in a state following one after the other. Even a vehicle 3-2 and a vehicle 3-3 between which another group of several vehicles are present may be deemed a "group of vehicles".

Further, in the above embodiments, when the server 2 side can determine in advance that the vehicles at the side yielding the lane form a group of vehicles, the fact of the vehicles yielding the lane forming a group of vehicles may be notified in advance to the vehicle trying to change a lane.

The invention claimed is:

1. A lane change assist system comprising:
a first terminal in a first vehicle, a second terminal in a second vehicle, and a third terminal in a third vehicle; and
a lane change assist device configured to be able to communicate with the first terminal, the second terminal, and the third terminal and to manage the economic values held by the user of the first terminal or the first vehicle, the user of the second terminal or the second vehicle, and the user of the third terminal or the third vehicle, wherein
the lane change assist device is configured to decrease the economic value held by the user of the first terminal or the first vehicle and increase the economic value held by the user of the third terminal or the third vehicle when the first vehicle driving on the first driving lane cuts into between the second vehicle and the third vehicle driving on a second driving lane adjoining the first driving lane and changes lanes to the front of the third vehicle driving at the rear of the second vehicle.

2. The lane change assist system according to claim 1, wherein
the lane change assist device is configured so that if the second vehicle and the third vehicle formed a group of vehicles belonging to a specific group, it changes an amount of decrease of economic value held by the user of the first terminal or the first vehicle in accordance with the group to which the first vehicle belongs.

3. The lane change assist system according to claim 2, wherein
the lane change assist device is configured so that if the second vehicle and the third vehicle had formed a group of vehicles belonging to a specific group, when the group to which the first vehicle belongs and the group to which the second vehicle and the third vehicle belong differ, it increases the amount of decrease of economic value held by the user of the first terminal or the first vehicle compared with if the second vehicle and the third vehicle did not form a group of vehicles belonging to a specific group.

4. The lane change assist system according to claim 2, wherein
the lane change assist device is configured so that if the second vehicle and the third vehicle had formed a group of vehicles belonging to a specific group, when the group to which the first vehicle belongs and the group to which the second vehicle and the third vehicle belong are the same, it decreases the amount of decrease of economic value held by the user of the first terminal or the first vehicle compared with if the second vehicle and the third vehicle did not form a group of vehicles belonging to a specific group.

5. The lane change assist system according to claim 1, wherein
the lane change assist device is configured so that if the second vehicle and the third vehicle formed a group of vehicles belonging to a specific group, it changes an amount of increase of economic value held by the user of the third terminal or the third vehicle in accordance with the group to which the first vehicle belongs.

6. The lane change assist system according to claim 5, wherein
the lane change assist device is configured so that if the second vehicle and the third vehicle had formed a group of vehicles belonging to a specific group, when the group to which the first vehicle belongs and the group to which the second vehicle and the third vehicle belong differ, it increases the amount of increase of economic value held by the user of the third terminal or the third vehicle compared with if the second vehicle and the third vehicle did not form a group of vehicles belonging to a specific group.

7. The lane change assist system according to claim 2, wherein
the lane change assist device is configured so that if the second vehicle and the third vehicle had formed a group of vehicles belonging to a specific group, when the group to which the first vehicle belongs and the group to which the second vehicle and the third vehicle belong are the same, it decreases the amount of increase of economic value held by the user of the third terminal or the third vehicle compared with if the second vehicle and the third vehicle did not form a group of vehicles belonging to a specific group.

8. The lane change assist system according to claim 2, wherein
the lane change assist device is configured to judge to which groups the first vehicle, the second vehicle, and the third vehicle belong based on the vehicle group numbers sent from the first terminal, the second terminal, and the third terminal.

9. The lane change assist system according to claim 8, wherein
the vehicle group numbers are numbers input by occupants of the first vehicle, the second vehicle, and the third vehicle to the first terminal, the second terminal, and the third terminal.

10. The lane change assist system according to claim 8, wherein
the vehicle group numbers are numbers which are automatically assigned by the first terminal, the second terminal, and the third terminal based on the destinations of the first vehicle, the second vehicle, and the third vehicle.

11. A lane change assist device comprising:
a communication part configured to be able to communicate with a first terminal in a first vehicle, a second terminal in a second vehicle, and a third terminal in a third vehicle;
a storage part configured to store the economic values respectively held by the first vehicle or the user of the first terminal, the second vehicle or the user of the second terminal, and the third vehicle or the user of the third terminal; and
a control part, wherein
the control part is configured to decrease the economic value held by the user of the first terminal or the first vehicle and increase the economic value held by the user of the third terminal or the third vehicle when the first vehicle driving on the first driving lane cuts into between the second vehicle and the third vehicle driving on a second driving lane adjoining the first driving lane and changes lanes to the front of the third vehicle driving at the rear of the second vehicle.

12. A lane change assist method having a first terminal in a first vehicle, a second terminal in a second vehicle, and a third terminal in a third vehicle, wherein the lane change assist method comprises decreasing the economic value held by the user of the first terminal or the first vehicle and increasing the economic value held by the user of the third terminal or the third vehicle when the first vehicle driving on the first driving lane cuts into between the second vehicle and the third vehicle driving on a second driving lane adjoining the first driving lane and changes lanes to the front of the third vehicle driving at the rear of the second vehicle.

\* \* \* \* \*